United States Patent
Rafferty et al.

(10) Patent No.: US 10,647,344 B1
(45) Date of Patent: May 12, 2020

(54) MULTI-FUNCTION VEHICLE INPUT DEVICES WITH CONVEX DIALS FOR VEHICLE SYSTEMS CONTROL AND METHODS INCORPORATING THE SAME

(71) Applicant: Toyota Motor Engineering & Manufacturing North America, Inc., Plano, TX (US)

(72) Inventors: John Charles Rafferty, Dexter, MI (US); Lou M. Pope, Ypsilanti, MI (US); Clinton J. Williams, Saline, MI (US)

(73) Assignee: TOYOTA MOTOR ENGINEERING & MANUFACTURING NORTH AMERICA, INC., Plano, TX (US)

( * ) Notice: Subject to any disclaimer, the term of this patent is extended or adjusted under 35 U.S.C. 154(b) by 0 days.

(21) Appl. No.: 16/264,179

(22) Filed: Jan. 31, 2019

(51) Int. Cl.
| | |
|---|---|
| *B62D 1/04* | (2006.01) |
| *B60R 16/027* | (2006.01) |
| *G05G 9/02* | (2006.01) |
| *B60R 11/02* | (2006.01) |
| *G06F 3/0362* | (2013.01) |
| *G06F 3/044* | (2006.01) |
| *G05G 5/05* | (2006.01) |
| *B60R 11/00* | (2006.01) |

(52) U.S. Cl.
CPC .......... *B62D 1/046* (2013.01); *B60R 11/0264* (2013.01); *B60R 16/027* (2013.01); *G05G 5/05* (2013.01); *G05G 9/02* (2013.01); *G06F 3/0362* (2013.01); *G06F 3/044* (2013.01); *B60R 2011/001* (2013.01)

(58) Field of Classification Search
CPC .... G06F 3/0362; G06F 3/03547; G06F 3/016; G06F 3/0338; G06F 3/03549; B60K 37/06; B60K 2370/126; B60K 2370/143; B60K 35/00; B60K 2370/146; B60K 2370/1446; B60K 2370/782; B60K 2370/10; B60K 2370/12; B60K 2370/133; B60K 2370/137; G05G 9/047
USPC ........................... 345/156, 184, 173; 701/36
See application file for complete search history.

(56) References Cited

U.S. PATENT DOCUMENTS

| | | |
|---|---|---|
| 8,067,709 B2 | 11/2011 | Han et al. |
| 8,950,542 B2 | 2/2015 | Gordh et al. |
| 8,987,620 B2 | 3/2015 | Gohng et al. |
| 9,016,168 B2 | 4/2015 | Prokhorov |
| 9,931,933 B2 | 4/2018 | Shimada et al. |
| 2003/0023353 A1 | 1/2003 | Badarneh |
| 2016/0077601 A1 | 3/2016 | Tanaka |
| 2016/0320960 A1 | 11/2016 | Min et al. |

(Continued)

FOREIGN PATENT DOCUMENTS

DE  102011114051 B4  12/2016

*Primary Examiner* — Koosha Sharifi-Tafreshi
(74) *Attorney, Agent, or Firm* — Dinsmore & Shohl LLP

(57) ABSTRACT

A multi-function input apparatus of a steering wheel that includes an outer dial having a planar surface, and a center dial having a convex surface such that the center dial extends outwardly from the steering wheel. The center dial being disposed within the outer dial. The outer dial is rotatable about a rotation axis independent of the center dial such that the center dial is rotatably fixed when the outer dial rotates. The center dial is translatable on the steering wheel in a lateral direction and a longitudinal direction such that the outer dial translates simultaneously with the center dial such that the rotation axis is movable relative to the steering wheel.

20 Claims, 5 Drawing Sheets

(56) References Cited

U.S. PATENT DOCUMENTS

2017/0212633 A1 7/2017 You et al.
2017/0242487 A1 8/2017 Naboulsi

MULTI-FUNCTION VEHICLE INPUT DEVICES WITH CONVEX DIALS FOR VEHICLE SYSTEMS CONTROL AND METHODS INCORPORATING THE SAME

TECHNICAL FIELD

The present specification generally relates to input devices for controlling various vehicle systems and processes, and more specifically, to a multi-function input device that provides a central control location for operating various vehicle systems and that includes a convex surface for enhancing a visibility of the various function labels included thereon.

BACKGROUND

Vehicles generally include numerous systems, devices, and apparatuses on-board for use by occupants of the vehicle. For example, vehicles may generally include audio systems, communication devices, navigation apparatuses, cabin temperature systems, and the like. Such systems, devices, and apparatuses may generally include an abundance of settings, functionality, and selective controls that may be interacted with and/or adjusted by an occupant of the vehicle. These systems, devices, and apparatuses may generally require numerous input apparatuses within the vehicle for controlling their respective operation. Due to the varying functionality of such systems, devices, and apparatuses, an occupant of the vehicle may be required to perform complicated operation of input apparatuses to provide the desired control of the vehicle systems, devices, and apparatuses.

By engaging in extensive operation of an input apparatus, an occupant of the vehicle, such as an operator (e.g., driver), may be required to divert her attention from operating the vehicle in order to actuate the input apparatus to adequately control a vehicle system, device, or apparatus and/or to determine a relative desired setting with respect to the particular vehicle system, device, or apparatus being controlled. Diverting attention from operating the vehicle may generally entail an occupant diverting her eyes from a front of the vehicle, removing her hands from an apparatus controlling operation of the vehicle (e.g., a steering wheel), and/or other activities that may impair an occupant's uninterrupted control of the vehicle. Providing an input apparatus that facilitates an operation of multiple vehicle systems, devices, and/or apparatuses and a selective control of their corresponding settings and/or functionality may generally promote an uninterrupted control of the vehicle.

SUMMARY

In one embodiment, a multi-function input apparatus of a steering wheel comprising an outer dial having a planar surface, and a center dial having a convex surface such that the center dial extends outwardly from the steering wheel. The center dial being disposed within the outer dial. The outer dial is rotatable about a rotation axis independent of the center dial such that the center dial is rotatably fixed when the outer dial rotates. The center dial is translatable on the steering wheel in a lateral direction and a longitudinal direction such that the outer dial translates simultaneously with the center dial such that the rotation axis is movable relative to the steering wheel.

In another embodiment, a steering wheel of a vehicle comprising an outer rim, a center hub disposed within the outer rim, and an input apparatus positioned along the center hub. The input apparatus including an outer dial and a center dial disposed within the outer dial, and the center dial being curved relative to the outer dial such that the center dial extends outwardly from the center hub. The outer dial is rotatable relative to and independent of the center dial, and the outer dial is translatable relative to the center hub and simultaneous with the center dial in at least a first direction and a second direction. Translation of the center dial in the first direction actuates a first vehicle system and translation of the center dial in the second direction actuates a second vehicle system. Settings of the first vehicle system is navigable in response to rotation of the outer dial when the first vehicle system is actuated and settings of the second vehicle system is navigable in response to rotation of the outer dial when the second vehicle system is actuated.

In another embodiment, a multi-function input apparatus of a vehicle comprising a center dial protruding outwardly from a steering wheel of the vehicle, the center dial being selectively translatable on the steering wheel in a plurality of directions. The apparatus comprising an outer dial positioned about the center dial such that the center dial is encapsulated by the outer dial, the outer dial being rotatable about the center dial such that the center dial is rotatably fixed relative to the outer dial. The outer dial being translatable on the steering wheel simultaneous with the center dial. The apparatus further comprising a processor and non-transitory computer-readable medium storing computer-readable instructions that, when executed, cause the processor to actuate a vehicle system in response to the center dial translating in at least one of the plurality of directions. The processor further navigates a plurality of settings of the vehicle system in response to the outer dial rotating with the center dial translated in at least one of the plurality of directions.

These and additional features provided by the embodiments described herein will be more fully understood in view of the following detailed description, in conjunction with the drawings.

BRIEF DESCRIPTION OF THE DRAWINGS

The embodiments set forth in the drawings are illustrative and exemplary in nature and not intended to limit the subject matter defined by the claims. The following detailed description of the illustrative embodiments can be understood when read in conjunction with the following drawings, where like structure is indicated with like reference numerals and in which:

DETAILED DESCRIPTION

Embodiments of the present disclosure are generally directed to multi-function input apparatuses that may provide vehicle support control for an occupant of a vehicle, and in particular, selective control and operation of one or more devices or systems of the vehicle at a central location within a passenger cabin of the vehicle. For example, the multi-function input apparatus may be positioned along a steering wheel of the vehicle such that the input apparatus is centrally located near an operator of the vehicle to facilitate ease of access. Vehicle devices or systems that may be controlled by the multi-function input apparatus of the present disclosure may include, for example, an HVAC device, an audio system, a visual interface or heads-up display, a communication module, and the like. A manual actuation of the multi-function input apparatus may provide a selective activation of various vehicle systems and may further provide elaborate navigation and/or control of a plurality of settings corresponding to the vehicle system that is actuated. The multi-function input apparatus may generally include a convex surface that protrudes outwardly to improve a visibility of the input apparatus, and in particular, enhance a visibility of various vehicle system labels included on the input apparatus that correspond to the various vehicle systems controlled by the input apparatus.

One non-limiting example of a multi-function input apparatus includes an outer dial having a planar surface and a center dial having a convex surface. The outer dial and center dial of the multi-function input apparatus are positioned on a steering wheel of a vehicle such that the center dial extends outwardly from the steering wheel. The center dial of the multi-function input apparatus is disposed within the outer dial and the outer dial is rotatable about a rotation axis independent of the center dial such that the center dial is rotatably fixed when the outer dial rotates. In other words, the center dial of the multi-function input apparatus is not rotatable. Further, the center dial of the multi-function input apparatus is translatable along the steering wheel of the vehicle in at least a lateral direction and a longitudinal direction. The outer dial of the multi-function input apparatus translates simultaneously with the center dial such that the rotation axis of the outer dial is movable relative to the steering wheel of the vehicle.

Although embodiments herein are described in the context of multi-function input apparatuses controlling various vehicle systems or devices for automotive vehicles, embodiments are not limited thereto. For example, the multi-function input apparatuses described herein may be configured and compatible for use with various transportation systems, including, for example, motorcycles, bicycles, watercrafts, aircrafts, and/or the like. Other uses should generally be understood and are included within the scope of the present disclosure.

Figure 1:
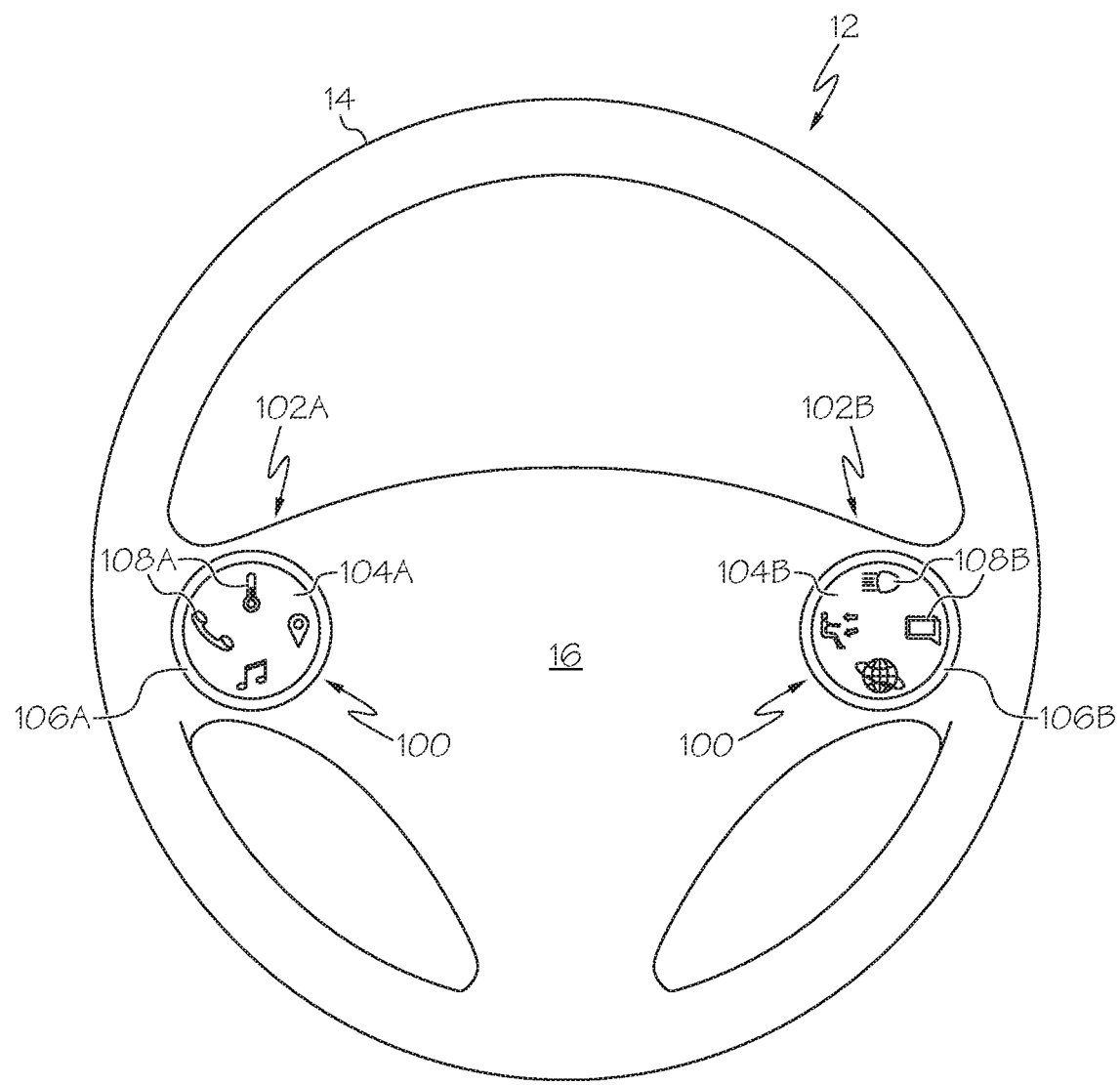
FIG. 1 schematically depicts an illustrative input apparatus positioned on a steering wheel of a vehicle, the input apparatus including an outer dial disposed about a center dial according to one or more embodiments shown and described herein.
Figure 5:
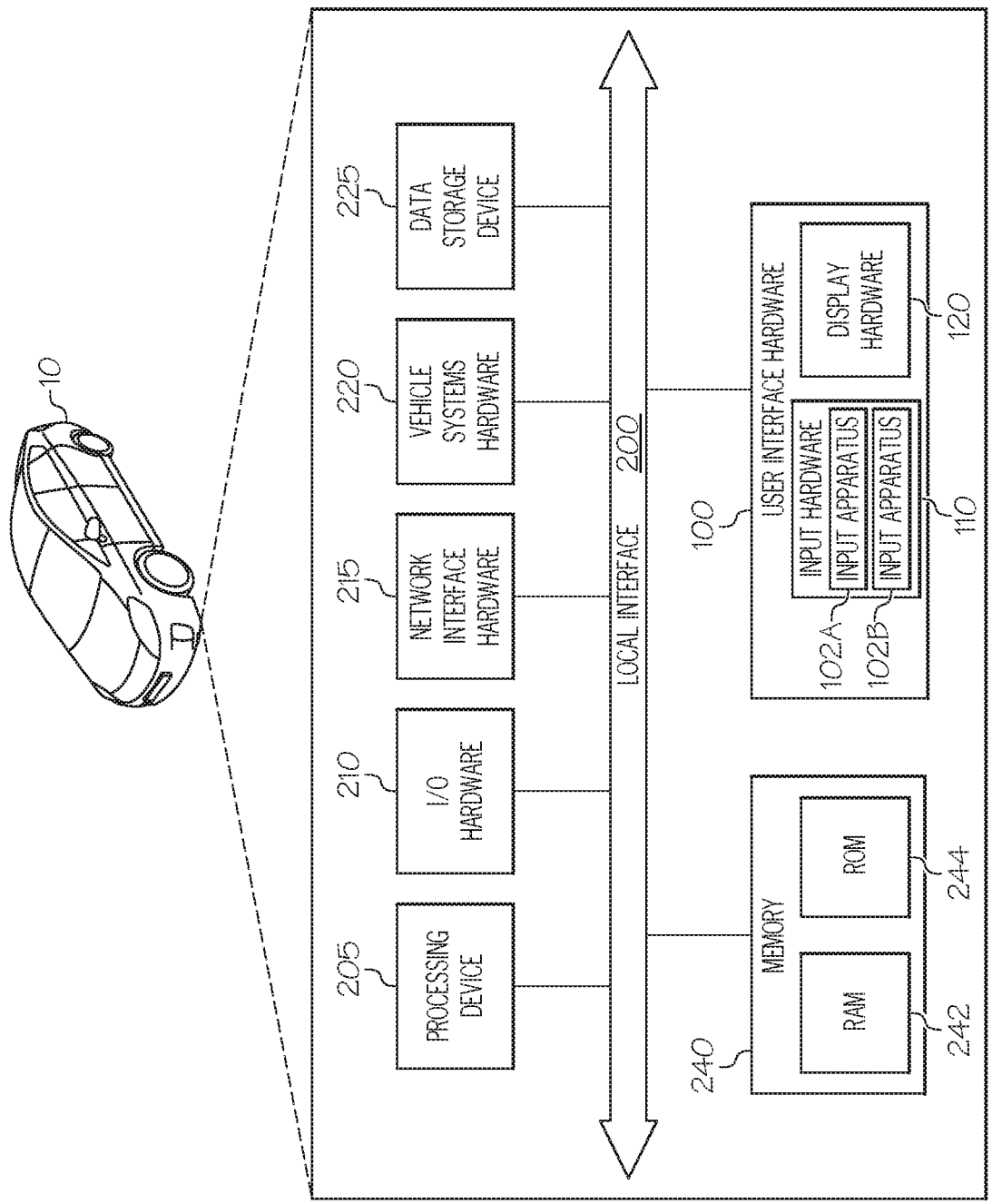
FIG. 5 schematically depicts illustrative hardware components of a vehicle including the input apparatus of FIG. 1 according to one or more embodiments shown and described herein.

Referring now to the drawings, FIG. 1 generally depicts a steering wheel 12 of a vehicle 10 (FIG. 5) including one or more user interface hardware 100 positioned thereon. In particular, illustrative input apparatuses 102A, 102B (i.e., user interface hardware 100) are depicted in FIG. 1 along a center hub 16 of the steering wheel 12. The input apparatuses 102A, 102B are positioned within an outer rim 14 of the steering wheel 12 along regions of the center hub 16 where an occupant of the vehicle 10, and in particular an operator of the vehicle 10, generally grasps the steering wheel 12 to operate the vehicle 10. In the present example, the steering wheel 12 includes a pair of input apparatuses 102A, 102B positioned along the center hub 16 at locations corresponding to locations where an operator's thumbs may generally be positioned when grasping the outer rim 14 of the steering wheel 12. It should be understood that the pair of input apparatuses 102A, 102B may be positioned along various other regions of the center hub 16, other portions of the steering wheel 12 (e.g., the outer rim 14), and/or other surfaces within a passenger cabin of the vehicle 10 (FIG. 5). For example, one or more input apparatuses 102A, 102B may be positioned adjacent to a front passenger seat of the vehicle 10, a rear passenger seat of the vehicle 10, and the like.

It should be further understood that in other embodiments the steering wheel 12 may include additional or fewer input apparatuses 102A, 102B than those shown and depicted herein. Additionally, the steering wheel 12 of the vehicle 10 may include other user interface hardware 100 (e.g., input hardware 110) positioned thereon in addition to the input apparatuses 102A, 102B described herein. It should be understood that the input apparatuses 102A, 102B described and depicted herein are substantially similar to one another except for the differences explicitly noted herein.

Still referring to FIG. 1, the input apparatus 102A includes a center dial 104A and an outer dial 106A. The outer dial 106A of the input apparatus 102A extends about the center dial 104A such that the center dial 104A is disposed within and encapsulated by the outer dial 106A. The center dial 104A and the outer dial 106A of the present examples include circular profiles, however, it should be understood that the center dial 104A and the outer dial 106A may have various other profiles, shapes, or sizes without departing from a scope of the present disclosure. As described in greater detail herein, the center dial 104A and the outer dial 106A of the input apparatus 102A may be selectively actuated by an operator of the vehicle 10 to initiate control of one or more vehicle systems or devices of the vehicle 10.

Still referring to FIG. 1, input apparatus 102B includes a center dial 104B and an outer dial 106B. The outer dial 106B of the input apparatus 102B extends about the center dial 104B such that the center dial 104B is disposed within and encapsulated by the outer dial 106B. The center dial 104B and the outer dial 106B of the present examples include circular profiles, however, it should be understood that the center dial 104B and the outer dial 106B may have various other profiles, shapes, or sizes without departing from a scope of the present disclosure. As described in greater detail herein, the center dial 104B and the outer dial 106B of the input apparatus 102B may be selectively actuated by an operator of the vehicle 10 to initiate control of one or more vehicle systems or devices of the vehicle 10.

Still referring to FIG. 1, the center dials 104A, 104B of the input apparatuses 102A, 102B include one or more vehicle system labels 108A, 108B positioned thereon. It should be understood that the one or more vehicle system labels 108A, 108B of the center dials 104A, 104B corresponds to the one or more vehicle systems or devices effectively controlled by the input apparatuses 102A, 102B, respectively. A relative position of the vehicle system labels 108A, 108B along the center dials 104A, 104B may be indicative of a direction of actuating the center dials 104A, 104B of the input apparatuses 102A, 102B to initiate control of the respective vehicle system corresponding to the vehicle system labels 108A, 108B. As merely an illustrative example, a first input apparatus 102A, positioned along a vehicle-outboard side of the center hub 16 of the steering wheel 12, may include one or more vehicle system labels 108A corresponding to vehicle systems or devices controlling a temperature of a passenger cabin of the vehicle 10 (e.g., a heating, ventilation and air-conditioning system), a Global Positioning System of the vehicle 10, a communications module, and/or an audio system. It should be understood that although the input apparatus 102A of the present example is described and depicted herein as including four vehicle system labels 108A, in other embodiments alternative, additional, and/or fewer vehicle system labels 108A may be included on the center dial 104A of the input apparatus 102A.

By way of further example, a second input apparatus 102B, positioned along a vehicle-inboard side of the center hub 16 of the steering wheel 12, may include one or more vehicle system labels 108B corresponding to vehicle systems or devices controlling a seat position within a passenger cabin of the vehicle 10, front/rear headlights of the vehicle 10, a position/orientation of side mirrors of the vehicle 10, and/or an internet connectivity within a passenger cabin of the vehicle 10. It should be understood that although the input apparatus 102B of the present example is described and depicted herein as including four vehicle system labels 108B, in other embodiments additional or fewer vehicle system labels 108B may be included on the center dial 104B of the input apparatus 102B corresponding to the respective vehicle systems or devices controlled by the input apparatus 102B.

Figure 2:
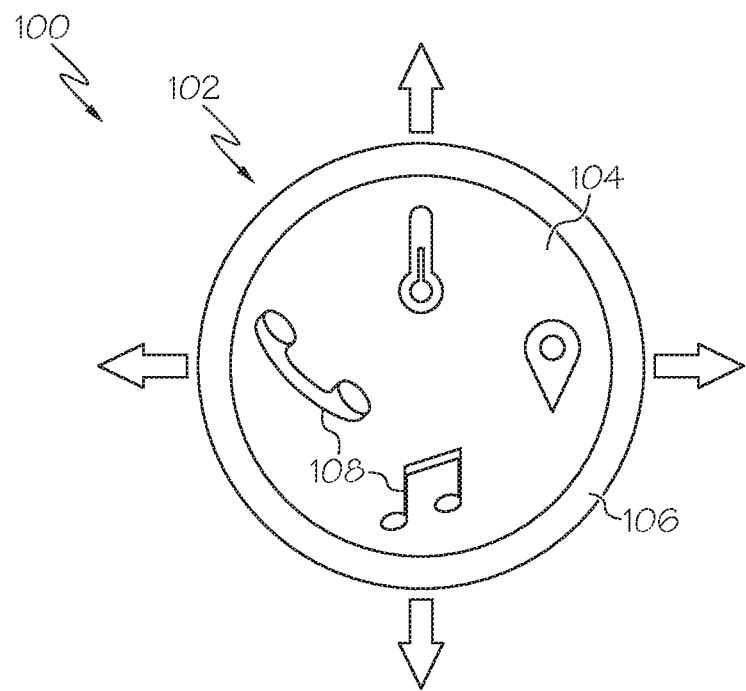
FIG. 2 schematically depicts illustrative methods of actuating the input apparatus of FIG. 1 by translating the input apparatus according to one or more embodiments shown and described herein.
Figure 3:
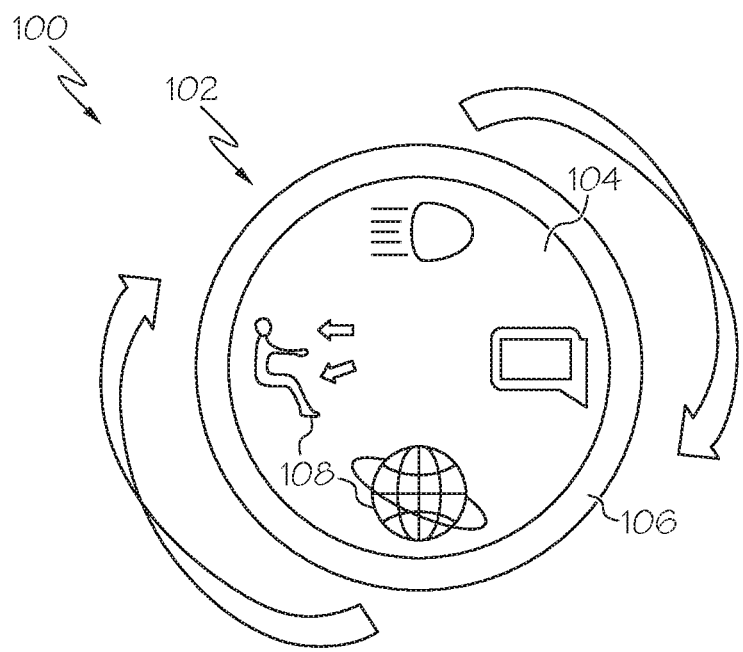
FIG. 3 schematically depicts illustrative methods of actuating the input apparatus of FIG. 1 by rotating the outer dial according to embodiments shown and described herein.
Figure 4:
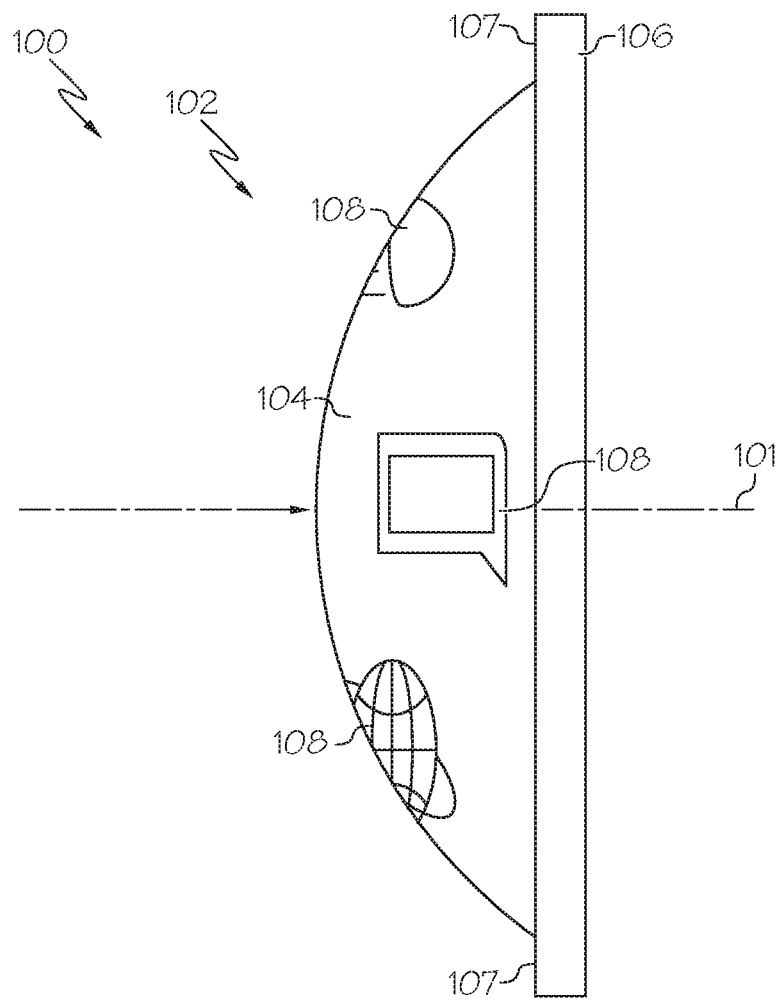
FIG. 4 schematically depicts the input apparatus of FIG. 1 with the center dial having a convex profile according to one or more embodiments shown and described herein.

Additional description of the input apparatuses 102A, 102B will be provided with respect to FIGS. 2-4, in which no distinction is made between the input apparatus 102A and the input apparatus 102B, but instead an input apparatus 102 corresponding to each of the input apparatus 102A and the input apparatus 102B is described.

Referring now to FIG. 2, the center dial 104 of the input apparatus 102 is selectively translatable in a plurality of directions. In the present example, the input apparatus 102 includes a four-way switch base such that the center dial 104 is translatable along two axes, such as, for example, in at least a lateral direction and a longitudinal direction relative to the center hub 16 of the steering wheel 12 (FIG. 1). In the present example, the center dial 104 of the input apparatus 102 is laterally translatable in the lateral direction, and in particular in a first lateral direction (e.g., toward a vehicle-outboard side) and a second lateral direction (e.g., toward a vehicle-inbooard side). Further, the center dial 104 of the input apparatus 102 is longitudinally translatable in the longitudinal direction, and in particular in a first longitudinal direction (e.g., relatively upward toward a top of the steering wheel 12) and a second longitudinal direction (e.g., relatively downward toward a bottom of the steering wheel 12). In some embodiments, the input apparatus 102 generates a tactile and/or audible feedback in response to a translation of the center dial 104 such that an occupant may detect and perceive a translation of the center dial 104 of the input apparatus 102.

It should be understood that with the outer dial 106 disposed about the center dial 104 of the input apparatus 102, translation of the center dial 104 in the lateral and/or longitudinal directions provides for a simultaneous translation of the outer dial 106 in the lateral and/or longitudinal directions, respectively. It should be further understood that both input apparatuses 102A, 102B (FIG. 1) of the present example may be configured and operable to translate in the one or more directions shown and described herein. In other embodiments, the input apparatuses 102A, 102B may be translatable in alternative, additional or fewer directions than the lateral and longitudinal directions described herein. For instance, the input apparatus 102 may include a six-way switch base (i.e., translatable along three axes), an eight-way switch base (i.e., translatable along four axes), and/or the like, such that the center dial 104 of the input apparatus 102 is translatable in at least a lateral direction, a longitudinal direction, and one or more other angled directions relative to the center hub 16 of the steering wheel 12 (FIG. 1). In some embodiments, the center dial 104 is resiliently biased to return to a default position in response to translating the center dial 104 in the lateral and/or longitudinal direction and subsequently releasing the center dial 104A. Accordingly, in this instance the center dial 104 translates from an extended position back to a default position when an occupant releases the center dial 104. In this embodiment, the center dial 104A of the input apparatus 102A is required to be physically maintained in position by an occupant in order to continue control of the respective vehicle systems hardware actuated such that releasing the center dial 104A terminates a corresponding control of the particular vehicle systems hardware actuated. It should be understood that in other embodiments the input apparatus 102 may remain in the extended position after a translation of the center dial 104 in a direction (e.g., lateral, longitudinal, transverse) despite a subsequent release of the input apparatus 102 by an occupant.

Referring now to FIG. 3, the outer dial 106 of the input apparatus 102 is selectively rotatable in a plurality of directions. In the present example, the input apparatus 102 includes a rotation axis 101 (FIG. 4) such that the outer dial 106 is rotatable in at least a clockwise direction and a counterclockwise direction relative to the center hub 16 of the steering wheel 12 (FIG. 1) and about the rotation axis 101. In some embodiments, the input apparatus 102 generates a tactile and/or audible feedback in response to a rotation of the outer dial 106 such that an occupant may detect and perceive a progressive rotation of the outer dial 106 of the input apparatus 102. It should be understood that with the outer dial 106 extending about the center dial 104 of the input apparatus 102, rotation of the outer dial 106 in the clockwise and/or counterclockwise directions does not provide for a simultaneous rotation of the center dial 104. In other words, the center dial 104 of the input apparatus 102 is rotatably fixed relative to the outer dial 106 such that the outer dial 106 of the input apparatus 102 is rotatable independent of the center dial 104. Accordingly, in the present example the outer dial 106 may selectively rotate about the center dial 104 of the input apparatus 102 in the clockwise and counterclockwise directions without providing a physical manipulation of the center dial 104 disposed therein.

In some embodiments a rotation of the outer dial 106 may be initiated prior to, simultaneous with, or after a translation of the center dial 104 and the outer dial 106. It should be further understood that both input apparatuses 102A, 102B (FIG. 1) of the present example may be configured and operable to rotate in the one or more directions shown and described herein. In other embodiments, the input apparatuses 102A, 102B may be rotatable in alternative, additional or fewer directions than the clockwise and counterclockwise directions described herein. For instance, the input apparatus 102 may include a singular-rotation base such that the outer dial 106 is only translatable in a single direction (e.g., clockwise) relative to the center hub 16 of the steering wheel 12 (FIG. 1) and about the rotation axis 101 (FIG. 4).

Referring now to FIG. 4, a side-elevational view of the input apparatus 102 is depicted with the center dial 104 including a convex surface and the outer dial 106 including a planar surface 107 extending perpendicular to the rotation axis 101. In the present example, the center dial 104 protrudes outwardly relative to the planar surface of the outer dial 106, such that the center dial 104 of the input apparatus 102 extends outward from the center hub 16 of the steering wheel 12 (FIG. 1). It should be understood that with the plurality of vehicle system labels 108 positioned along the convex surface of the center dial 104, the plurality of vehicle system labels 108 similarly protrude outwardly from the center hub 16 of the steering wheel 12. In other words, the plurality of vehicle system labels 108 of the input apparatus 102 extend outwardly at varying angles relative to the planar surface of the outer dial 106 of the input apparatus 102. In this instance, the plurality of vehicle system labels 108 are curved along the center dial 104 of the input apparatus 102.

It should be understood that a convex surface of the center dial 104 may facilitate and improve a visibility of the plurality of vehicle system labels 108 from various locations within a passenger cabin of the vehicle 10. In particular, due to an outward extension and/or profile of the plurality of vehicle system labels 108 along the curved surface of the center dial 104, and in particular the extension at continuously varying angles, the plurality of vehicle system labels 108 may be easily visible from varying angles and positions relative to the steering wheel 12. Additionally, in other embodiments the input apparatus 102, and in particular the center dial 104, may include a backlit display such that the convex surface is illuminated to thereby further improve a visibility of the plurality of vehicle system labels 108 positioned thereon.

In some embodiments, the center dial 104 of the input apparatus 102 may include a capacitive touch surface disposed thereon such that the center dial 104 is responsive to a conductive touch by an occupant, and in particular by a hand of an occupant received thereon. In this embodiment, actuation of the center dial 104 may be provided by engaging the capacitive touch surface of the center dial 104 with a hand of an occupant along a portion of the center dial 104 with at least one of the plurality of vehicle system labels 108 located thereon. In this instance, contacting at least one of the plurality of vehicle systems labels 108 along the capacitive surface of the center dial 104 provides initiation of a control of the respective vehicle system corresponding to the vehicle system label 108 contacted. In some embodiments, the center dial 104 and/or the outer dial 106 of the input apparatus 102 may be selectively translatable along (i.e, parallel with) the rotation axis 101 such that the input apparatus 102 translates toward (i.e., relatively into) and away (i.e., relatively outward) from the center hub 16 of the steering wheel 12 (FIG. 1).

Referring now to FIG. 5, illustrative hardware components of the vehicle 10 is schematically depicted. The hardware components of the vehicle 10 may be used to provide a functionality of one or more input apparatuses 102 described in further detail herein. Generally, the illustrative input apparatuses 102A, 102B depicted in FIG. 1 may be positioned within a vehicle 10 and provide particular use in assisting occupants of the vehicle 10 in controlling the vehicle 10 and/or various vehicle systems of the vehicle 10. However, it should be appreciated that the vehicle 10 is not limited to this use and may be used for other purposes without departing from the scope of the present disclosure.

The example vehicle 10 including the illustrative input apparatuses 102A, 102B generally includes a non-transitory computer-readable medium containing one or more programming instructions for completing the various processes described herein, which may be embodied as hardware, software, and/or firmware, according to embodiments shown and described herein. While in some embodiments the various components of the vehicle 10 may be configured as a general purpose computer with the requisite hardware, software, and/or firmware, in other embodiments, the various components of the vehicle 10 may also be configured as a special purpose computer designed specifically for performing the functionality described herein.

Still referring to FIG. 5, the vehicle 10 may include the user interface hardware 100, such as the input hardware 110 described above (including the input apparatus 102A, and the input apparatus 102B), a processing device 205, I/O hardware 210, network interface hardware 215, vehicle systems hardware 220, a data storage device 225, and a non-transitory memory component 240. A local interface 200, such as a bus or the like, may interconnect the various components. The user interface hardware 100 may include any device, mechanism, system, interactive display, and/or various other hardware components for communicating information from an occupant to the vehicle 10, and in particular the one or more systems within the vehicle 10 (e.g., network interface hardware 215, vehicle systems hardware 220, and the like). For example, the user interface hardware 100 may include input hardware 110, such as the input apparatus 102 described above, a touch screen, button, microphone, and/or other device for receiving inputs from an occupant. The user interface hardware 100 may further include display hardware 120, such as, for example, a video card, heads-up display 122 (FIG. 6), dashboard display 124 (FIG. 6), console display 126 (FIG. 6), mirror display, and/or other device for sending or presenting visual data to a user. In some embodiments, the user interface hardware 100 may incorporate audio output hardware that generates and presents audible data to a user, such as, for example, spoken words, tones, music, and/or the like. It should be understood that the user interface hardware 100 may be integrated with the vehicle 10 in various other forms as described in more detail herein. It should further be understood that with an inclusion of the one or more input apparatus 102A, 102B of the present disclosure in the vehicle 10, fewer user interface hardware 100, and in particular fewer input hardware 110, may be required due to a plurality of vehicle systems being effectively controlled by the input apparatus 102A, 102B.

The processing device 205, such as a computer processing unit (CPU), may be the central processing unit of the vehicle 10, performing calculations and logic operations to execute a program. The processing device 205, alone or in conjunction with the other components, is an illustrative processing device, computing device, processor, or combination thereof. The processing device 205 may include any processing component configured to receive and execute instructions (such as from the data storage device 225 and/or the memory component 240). The I/O hardware 210 may communicate information between the local interface 200 and one or more other components of the vehicle 10. For example, the I/O hardware 210 may act as an interface between the various components described with respect to FIG. 5 and other components of the vehicle 10, such as user interface hardware 100 (e.g., the input apparatus 102) that controls information communicated by an occupant of the vehicle 10 to vehicle systems hardware 220, network interface hardware 215, and the like for purposes of controlling an operation of various systems within the vehicle 10. The I/O hardware 210 may be utilized to transmit one or more commands from the input apparatus 102 to the other components of the vehicle 10 in some embodiments.

Still referring to FIG. 5, the network interface hardware 215 may include any wired or wireless networking hardware, such as a modem, LAN port, wireless fidelity (Wi-Fi) card, WiMax card, mobile communications hardware, and/or other hardware for communicating with other networks and/or devices. The vehicle systems hardware 220 may be one or more hardware components for providing a particular functionality or operation of the vehicle 10. For example, the vehicle systems hardware 220 may include a heating, ventilation and air conditioning (HVAC) system, a seat adjustment mechanism, a window, a mirror (e.g., side, rear, etc.), a Global Positioning System (GPS), an internet connectivity, a headlight activation, a communication module (e.g., telephonic devices), a multimedia electronic device, and/or the like. The data storage device 225, which may generally be a storage medium, may contain one or more data repositories for storing data that is received and/or generated. The data storage device 225 may be any physical storage medium, including, but not limited to, a hard disk drive (HDD), solid-state memory, removable storage, and/or the like. While the data storage device 225 is depicted as a local device, it should be understood that the data storage device 225 may be a remote storage device, such as, for example, a server computing device, cloud based storage device, or the like.

The memory component 240 may be configured as a volatile and/or a nonvolatile computer-readable medium and, as such, may include random access memory 242 (including SRAM, DRAM, and/or other types of random access memory), read only memory (ROM) 244, flash memory, registers, compact discs (CD), digital versatile discs (DVD), and/or other types of storage components. The memory component 240 may include one or more programming instructions thereon that, when executed by the processing device 205, cause the processing device 205 to complete various processes. The programming instructions stored on the memory component 240 may be embodied as a plurality of software logic modules, where each logic module provides programming instructions for completing one or more tasks, such as initiating control of the vehicle systems hardware 220 in response to selective actuation of the input apparatus 102.

Figure 6:
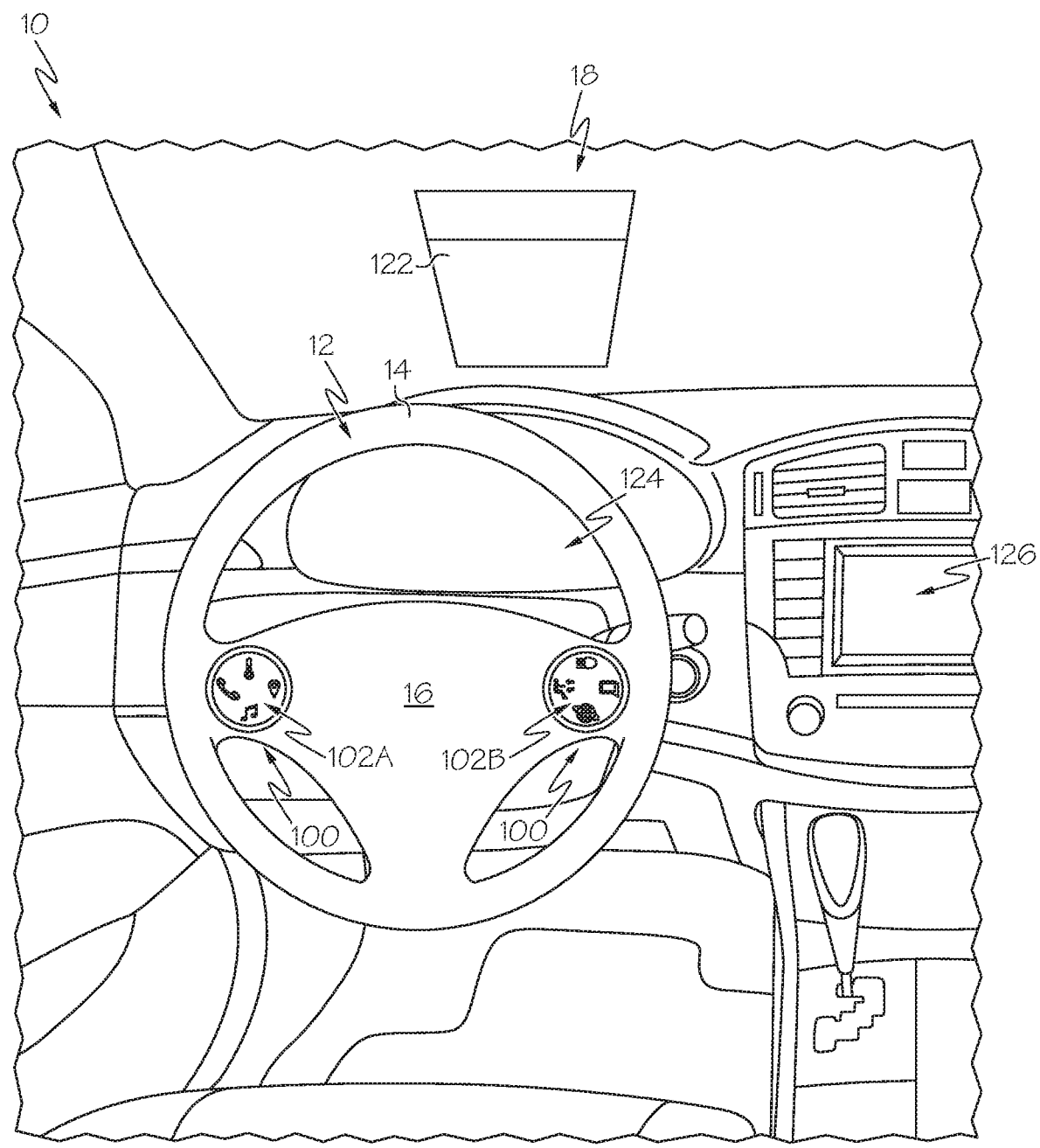
FIG. 6 schematically depicts the input apparatus of FIG. 1 communicatively coupled to one or more displays in a vehicle according to one or more embodiments shown and described herein.

Referring now to FIG. 6 in conjunction with FIG. 5, one or more of the network interface hardware 215, the vehicle systems hardware 220, and the like, may be controlled by an occupant of the vehicle 10 in response to receiving an input at the input hardware 110, and in particular at the one or more input apparatuses 102A, 102B. As mentioned above, the various components described with respect to FIG. 5 may be used to carry out one or more processes and/or provide functionality for controlling various vehicle systems in the vehicle 10. Illustrative examples of the various processes are described herein according to some embodiments. The various steps described herein are merely illustrative, such that additional, fewer or alternative steps are contemplated without departing from the scope of the present disclosure.

In the present example, the vehicle 10 includes a pair of input apparatuses 102A, 102B positioned along the center hub 16 of the steering wheel 12. In other embodiments the pair of input apparatuses 102A, 102B may be positioned along various other surfaces and/or locations within a passenger cabin of the vehicle 10. An operator may utilize the pair of input apparatuses 102A, 102B to actuate one or more vehicle systems or devices in the vehicle 10. Further, an occupant may selectively control, navigate, adjust and manipulate a comprehensive list of settings, preferences, controls, options, data, functionality outputs, menus and the like of the one or more vehicle systems or devices with the pair of input apparatuses 102A, 102B. Initially, an input command may be received via at least one of the pair of input apparatuses 102A, 102B by actuating the center dial 104A, 104B of the input apparatus 102A, 102B (i.e., moving) in a direction corresponding to a particular vehicle system that an occupant desires to control. It should be understood that in other embodiments an input command may be initially received by actuating the outer dial 106A, 106B in a particular direction (e.g., clockwise, counterclockwise, and the like).

Still referring to FIG. 6, an occupant may identify the desired vehicle systems hardware 220 to initiate control of by viewing the plurality of vehicle system labels 108A, 108B located along the center dial 104A, 104B of the input apparatus 102A, 102B. Due to a convex surface of the center dial 104A, 104B (FIG. 4), an occupant may easily identify the plurality of vehicle system labels 108A, 108B included on the input apparatus 102A, 102B from a plurality of locations within a passenger cabin of the vehicle 10. In other words, the plurality of vehicle system labels 108A, 108B of the input apparatus 102A, 102B are curved and extend along the convex surface of the center dial 104A, 104B at varying angles such that a visibility of the plurality of vehicle system labels 108A, 108B is increased for ease of reference by one or more occupants within the vehicle 10.

The input apparatuses 102A, 102B are communicatively coupled to display hardware 120, and in particular to at least one of the heads-up display 122, the dashboard display 124, or the console display 126. The one or more programming instructions included in the memory component 240, when executed by the processing device 205, causes the processing device 205 to transmit corresponding information and data displayed on the display hardware 120 in response to an actuation of the center dial 104A, 104B of the input apparatus 102A, 102B. In instances, with either the heads-up display 122, the dashboard display 124, and/or the console display 126 (i.e., display hardware 120) displaying a plurality of vehicle systems hardware 220 included in the vehicle 10, actuation of the center dial 104A, 104B allows an occupant to select from the plurality of vehicle systems hardware 220. In particular, the one or more programming instructions included in the memory component 240, when executed by the processing device 205, causes the processing device 205 to detect an actuation (i.e., translation) of the center dial 104A, 104B of the input apparatus 102A, 102B. In the present example, the processing device 205 detects a relative direction of translation of the center dial 104A, 104B by an occupant. The one or more programming instructions executed by the processing device 205 causes data corresponding to the actuated vehicle system hardware 220 to be transmitted via a signal to the corresponding network interface hardware 215 for purposes of displaying a real-time control of the selected vehicle system hardware 220 with the input apparatus 102A, 102B.

For example, slidably translating the center dial 104A of the input apparatus 102A in a first, lateral direction toward a vehicle-outboard side may initiate control of a communications module (e.g., telephonic device) of the vehicle systems hardware 220 such that an occupant of the vehicle 10 thereby receives control of the various operabilities of the communication module. The one or more programming instructions executed by the processing device 205 causes an actuation of the corresponding vehicle systems hardware 220 (e.g., communications module) in response to translating the center dial 104A of the input apparatus 102 in the respective direction of the vehicle system label 108A corresponding to the communications module.

Still referring to FIG. 6, the one or more programming instructions included in the memory component 240, when executed by the processing device 205, causes the processing device 205 to transmit a signal to the display hardware (e.g., the heads-up display 122, the dashboard display 124, and/or the console display 126) of the vehicle 10 in response to an occupant actuating the input apparatus 102A, 102B. In the present example, with the center dial 104A of the input apparatus 102A translated in the first, lateral direction, the one or more programming instructions included in the memory component 240, when executed by the processing device 205, causes the processing device 205 to communicate data corresponding to the selected vehicle systems hardware 220 (e.g., the communication module) to at least one of the display hardware 120 for the occupant's review while determining a selective control preference of the vehicle systems hardware 220. In this instance, the one or more programming instructions executed by the processing device 205 causes the display hardware 120 to dynamically update and communicate information relating to the various list of settings, preferences, data, menus, options, functionality output and the like of the selected-vehicle systems hardware 220 in response to detecting a continued actuation of the input apparatus 102A, such as, for example, a rotation of the outer dial 106A.

In the present example, with control of the communications module initiated, in response to a translation of the center dial 104A in a direction corresponding to an actuation of the communication module (i.e., vehicle systems hardware 220), a subsequent rotation of the outer dial 106A may provide an occupant an ability to navigate through various menus and/or settings, such as, for example, searching through a contact directory stored within the memory component 240, navigating a historical record of recent communications conducted on the communication module, reviewing message data, and/or the like. As the outer dial 106A is further rotated about the center dial 104A and the rotation axis 101 of the input apparatus 102A (FIG. 4), the one or more programming instructions executed by the processing device 205 causes the display hardware 120 (e.g., the heads-up display 122, dashboard display 124, console display 126, and/or the like) to continue to display updated data to provide an occupant with a real-time observation of the extensive settings, preferences, data, menus, options, and/or functionality output navigated through.

When the particular vehicle system setting desired to be controlled by an occupant is effectively arrived at (e.g., scrolled to), the one or more programming instructions executed by the processing device 205 causes detection of an actuation of the particular setting of the communications module when the center dial 104A and/or the outer dial 106A translates along the rotation axis 101. An operator may effectively select the desired setting to actuate by observing the corresponding information dynamically displayed along the display hardware 120 (e.g., the heads-up display 122, dashboard display 124, console display 126, and/or the like) of the vehicle 10 as the outer dial 106A is rotated. In other words, upon arriving to the desired setting and/or functionality output of the communication module (i.e., vehicle system hardware 220), an occupant translates the center dial 104A and/or outer dial 106A of the input apparatus 102A in a direction parallel to the rotation axis 101 (FIG. 4) to thereby select the respective setting, thereby applying control of the particular setting of the communications module.

The above-described system includes components that provide multi-function input apparatuses for selective control and operation of one or more devices or systems of a vehicle (e.g., an HVAC device, an audio system, a visual interface or heads-up display, a communication module, and the like) at a central location within a passenger cabin of the vehicle. The multi-function input apparatus may be positioned along a steering wheel of the vehicle to facilitate ease of access for an occupant of the vehicle. A manual actuation of a center dial of the multi-function input apparatus, and specifically a particular direction of translating the center dial, may provide a selective activation of various vehicle systems. A manual actuation of an outer dial of the multi-function input apparatus, and specifically a particular direction of rotating the outer dial, may further provide an elaborate navigation and/or control of a plurality of settings relative to the vehicle system actuated. The multi-function input apparatus may generally include a convex surface that protrudes outwardly to improve a visibility of the input apparatus and any vehicle system labels included on the input apparatus.

It is noted that the terms "substantially" and "about" may be utilized herein to represent the inherent degree of uncertainty that may be attributed to any quantitative comparison, value, measurement, or other representation. These terms are also utilized herein to represent the degree by which a quantitative representation may vary from a stated reference without resulting in a change in the basic function of the subject matter at issue.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

What is claimed is:

1. A multi-function input apparatus of a steering wheel comprising:
 an outer dial having a planar surface; and
 a center dial having a convex surface such that the center dial extends outwardly from the steering wheel, the center dial being disposed within the outer dial,
 wherein the outer dial is rotatable about a rotation axis independent of the center dial such that the center dial is rotatably fixed when the outer dial rotates, and
 wherein the center dial is translatable on the steering wheel in a lateral direction and a longitudinal direction such that the outer dial translates simultaneously with the center dial such that the rotation axis is movable relative to the steering wheel.

2. The multi-function input apparatus of claim 1, wherein the center dial includes at least one vehicle system label positioned on the convex surface.

3. The multi-function input apparatus of claim 2, wherein the convex surface is configured to extend the at least one vehicle system label outwardly at varying angles relative to the planar surface of the outer dial.

4. The multi-function input apparatus of claim 3, wherein the at least one vehicle system label is curved along the center dial such that the at least one vehicle system label is visible from varying angles relative to the steering wheel.

5. The multi-function input apparatus of claim 1, wherein the center dial is resiliently biased to return to a default position in response to translating the center dial in the lateral direction or the longitudinal direction.

6. The multi-function input apparatus of claim 1, wherein the center dial is translatable in a first angled direction and a second angled direction.

7. The multi-function input apparatus of claim 1, wherein translation of the center dial in the lateral direction is configured to actuate a first vehicle system and translation of the center dial in the longitudinal direction is configured to actuate a second vehicle system.

8. The multi-function input apparatus of claim 7, wherein rotation of the outer dial is configured to navigate through a plurality of settings of the vehicle system.

9. The multi-function input apparatus of claim 1, wherein the center dial is translatable along the rotation axis and toward the steering wheel.

10. The multi-function input apparatus of claim 1, wherein the outer dial includes a capacitive touch surface positioned thereon such that the outer dial is responsive to conductive touch.

11. The multi-function input apparatus of claim 1, wherein the center dial includes a capacitive touch surface positioned thereon such that the center dial is responsive to conductive touch.

12. The multi-function input apparatus of claim 1, wherein the center dial and the outer dial are positioned on a center hub of the steering wheel adjacent to an outer rim of the steering wheel.

13. A steering wheel of a vehicle comprising:
an outer rim;
a center hub disposed within the outer rim; and
an input apparatus positioned along the center hub, the input apparatus including an outer dial and a center dial disposed within the outer dial, and the center dial being curved relative to the outer dial such that the center dial extends outwardly from the center hub,
wherein the outer dial is rotatable relative to and independent of the center dial, and the outer dial is translatable relative to the center hub and simultaneously with the center dial in at least a first direction and a second direction, and
wherein translation of the center dial in the first direction actuates a first vehicle system and translation of the center dial in the second direction actuates a second vehicle system, wherein settings of the first vehicle system is navigable in response to rotation of the outer dial when the first vehicle system is actuated and settings of the second vehicle system is navigable in response to rotation of the outer dial when the second vehicle system is actuated.

14. The steering wheel of claim 13, wherein the first vehicle system comprises a Global Positioning System, an HVAC system, a communications module, or a display device.

15. The steering wheel of claim 13, wherein the center dial includes at least one vehicle system label positioned thereon such that the at least one vehicle system label extends outwardly from the center hub and is curved relative to the center hub, wherein the at least one vehicle system label is visible from varying angles relative to the steering wheel.

16. The steering wheel of claim 13, wherein the outer dial and the center dial are translatable in a third direction toward the center hub.

17. A multi-function input apparatus of a vehicle comprising:
a center dial protruding outwardly from a steering wheel of the vehicle, the center dial being selectively translatable on the steering wheel in a plurality of directions;
an outer dial positioned about the center dial such that the center dial is encapsulated by the outer dial, the outer dial being rotatable about the center dial such that the center dial is rotatably fixed relative to the outer dial, and the outer dial being translatable on the steering wheel simultaneous with the center dial;
a processor; and
non-transitory computer-readable medium storing computer-readable instructions that, when executed, cause the processor to:
actuate a vehicle system in response to the center dial translating in at least one of the plurality of directions; and
navigate a plurality of settings of the vehicle system in response to the outer dial rotating with the center dial translated in at least one of the plurality of directions.

18. The multi-function input apparatus of claim 17, wherein the computer-readable instructions, when executed, cause the processor to select at least one of the plurality of settings of the vehicle system in response to the center dial translating toward the steering wheel.

19. The multi-function input apparatus of claim 18, wherein the computer-readable instructions, when executed, cause the processor to adjust the at least one of the plurality of settings of the vehicle system in response to the outer dial rotating about the center dial.

20. The multi-function input apparatus of claim 17, wherein the center dial includes a plurality of vehicle system labels positioned such that the plurality of vehicle system labels protrude outwardly from the steering wheel.

* * * * *